(12) United States Patent
Lee et al.

(10) Patent No.: US 8,700,055 B2
(45) Date of Patent: Apr. 15, 2014

(54) MAINTAINING LOCATION BASED SERVICE SESSION CONTINUITY DURING INTER-RAT MOBILITY

(75) Inventors: Kuo-Chun Lee, San Diego, CA (US); Srinivasan Balasubramanian, San Diego, CA (US); Kirk A. Burroughs, Alamo, CA (US); Thomas Klingenbrunn, San Diego, CA (US); Ie-Hong Lin, Cupertino, CA (US); Arash Mirbagheri, San Diego, CA (US); Jean-Michel R. Rousseau, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 13/220,783

(22) Filed: Aug. 30, 2011

(65) Prior Publication Data

US 2013/0053034 A1    Feb. 28, 2013

(51) Int. Cl.
  *H04W 24/00*    (2009.01)
(52) U.S. Cl.
  USPC ............ 455/456.1; 455/404.2; 455/436; 455/440; 455/456.2
(58) Field of Classification Search
  USPC ......... 455/404.1, 404.2, 436–440, 456.1–457
  See application file for complete search history.

(56) References Cited

U.S. PATENT DOCUMENTS

| 8,462,729 B2 * | 6/2013 | Karnam et al. ............... 370/331 |
| 2004/0266435 A1 * | 12/2004 | de Jong et al. ................ 455/436 |
| 2007/0021127 A1 * | 1/2007 | Zheng ......................... 455/456.1 |
| 2009/0233620 A1 * | 9/2009 | Fischer et al. .............. 455/456.1 |
| 2010/0120435 A1 * | 5/2010 | Mia et al. ....................... 455/440 |
| 2010/0202407 A1 * | 8/2010 | Edge .............................. 370/331 |
| 2010/0232393 A1 | 9/2010 | Shuai et al. |
| 2010/0284366 A1 * | 11/2010 | Zhu ............................... 370/331 |
| 2010/0311386 A1 * | 12/2010 | Edge et al. ................. 455/404.1 |

(Continued)

FOREIGN PATENT DOCUMENTS

| EP | 2214444 A1 | 8/2010 |
| WO | WO 2012/096608 | * 7/2012 ............ H04W 64/00 |

OTHER PUBLICATIONS

3rd Generation Partnership Project; Technical Specification Group Services and System Aspects; Evaluation of LCS Control Plane Solutions for EPS (Release 9), 3GPP Standard; 3GPP TR 23.891, 3rd, Generation Partnership Project (3GPP), Mobile Competence Centre ; 650, Route Des Lucioles ; F-06921 Sophia-Anti POL1 S Cedex ; France, No. V.9.0.0, Mar. 1, 2009, pp. 1-64, XP050364142, p. 29 p. 35-p. 38.

(Continued)

*Primary Examiner* — Lester Kincaid
*Assistant Examiner* — Mehmood B Khan
(74) *Attorney, Agent, or Firm* — Seyfarth Shaw LLP

(57) ABSTRACT

When a user equipment engaged in mobile communications transfers from a network with one radio access technology (RAT) to another network with a different radio access technology, maintaining continuity of location based services can improve system performance. A user equipment may perform a series of checks when undergoing inter-RAT transfer to determine if a location based services protocol used with the source network is operable on the target network. The UE also determines if location based services sessions are at a point where they can be continued following inter-RAT transfer. Where possible, protocols and sessions are maintained to preserve location based services continuity.

16 Claims, 8 Drawing Sheets

(56) References Cited

U.S. PATENT DOCUMENTS

| | | | |
|---|---|---|---|
| 2011/0003602 A1* | 1/2011 | Kim et al. | 455/456.1 |
| 2011/0009130 A1* | 1/2011 | Wu | 455/456.1 |
| 2011/0013589 A1 | 1/2011 | Wu | |
| 2012/0083241 A1* | 4/2012 | Annamalai et al. | 455/404.2 |
| 2012/0122472 A1* | 5/2012 | Krishnamurthy et al. | 455/456.1 |
| 2012/0224564 A1* | 9/2012 | Paisal et al. | 370/331 |
| 2013/0142032 A1* | 6/2013 | Wu | 370/216 |

OTHER PUBLICATIONS

International Search Report and Written Opinion—PCT/US2011/050035—ISA/EPO—May 21, 2012.

* cited by examiner

MAINTAINING LOCATION BASED SERVICE SESSION CONTINUITY DURING INTER-RAT MOBILITY

BACKGROUND

1. Field

Aspects of the present disclosure relate generally to wireless communication systems, and more particularly to maintaining the continuity of location based services when operating between radio access technologies.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters.

SUMMARY

Offered is a method for managing location based services during wireless communication. The method includes performing inter-RAT system change of a user equipment from a source base station of a first radio access technology (RAT) to a target base station of a second RAT. The method also includes determining whether a position location session has started. The method further includes determining if a positioning protocol used with the first RAT is compatible with the second RAT when the position location session has started. The method still further includes continuing the position location session with the positioning protocol of the first RAT when the positioning protocol is compatible with the second RAT. The method also includes either restarting the position location session or awaiting network initiation of a new position location session when the positioning protocol is not compatible with the second RAT. The method further includes initiating a position location session with a positioning protocol of the second RAT when the position location session has not started.

Offered is an apparatus for wireless communication. The apparatus includes means for performing inter-RAT system change of a user equipment from a source base station of a first radio access technology (RAT) to a target base station of a second RAT. The apparatus also includes means for determining whether a position location session has started. The apparatus further includes means for determining if a positioning protocol used with the first RAT is compatible with the second RAT when the position location session has started. The apparatus still further includes means for continuing the position location session with the positioning protocol of the first RAT when the positioning protocol is compatible with the second RAT. The apparatus also includes means for either restarting the position location session or awaiting network initiation of a new position location session when the positioning protocol is not compatible with the second RAT. The apparatus further includes means for initiating a position location session with a positioning protocol of the second RAT when the position location session has not started.

Offered is a computer program product for wireless communication. The computer program product includes non-transitory computer-readable medium having program code recorded thereon. The program code includes program code to perform inter-RAT system change of a user equipment from a source base station of a first radio access technology (RAT) to a target base station of a second RAT. The program code also includes program code to determine whether a position location session has started. The program code further includes program code to determine if a positioning protocol used with the first RAT is compatible with the second RAT when the position location session has started. The program code still further includes program code to continue the position location session with the positioning protocol of the first RAT when the positioning protocol is compatible with the second RAT. The program code also includes program code to either restart the position location session or await network initiation of a new position location session when the positioning protocol is not compatible with the second RAT. The program code further includes program code to initiate a position location session with a positioning protocol of the second RAT when the position location session has not started.

Offered is an apparatus for wireless communication. The apparatus includes a processor(s) and a memory coupled to the processor(s). The processor(s) is configured to perform inter-RAT system change of a user equipment from a source base station of a first radio access technology (RAT) to a target base station of a second RAT. The processor(s) is also configured to determine whether a position location session has started. The processor(s) is further configured to determine if a positioning protocol used with the first RAT is compatible with the second RAT when the position location session has started. The processor(s) is still further configured to continue the position location session with the positioning protocol of the first RAT when the positioning protocol is compatible with the second RAT. The processor(s) is also configured to either restart the position location session or await network initiation of a new position location session when the positioning protocol is not compatible with the second RAT. The processor(s) is further configured to initiate a position location session with a positioning protocol of the second RAT when the position location session has not started.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
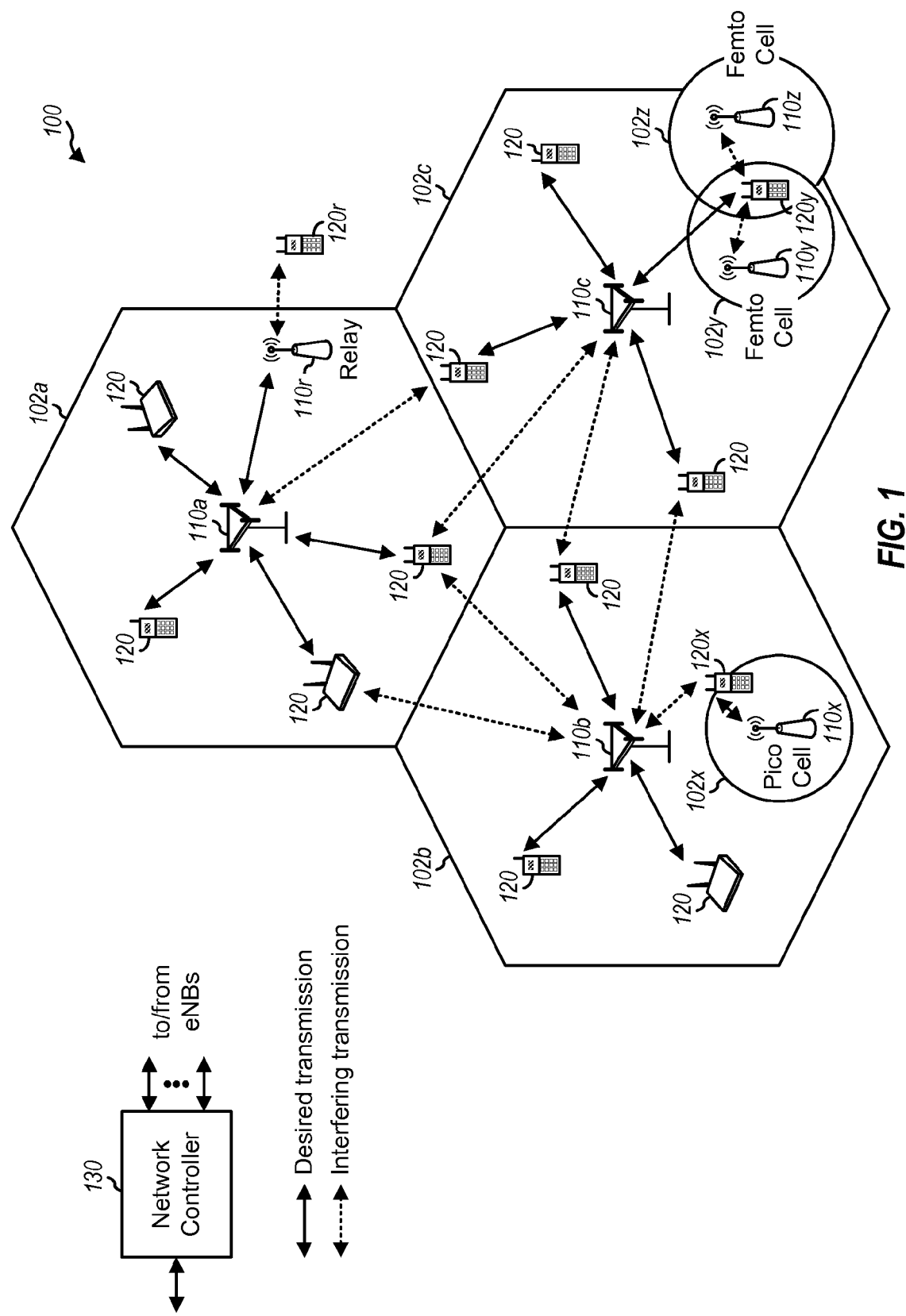
FIG. 1 is a block diagram conceptually illustrating an example of a telecommunications system.

FIG. 1 shows a wireless communication network 100, which may be an LTE network, in which maintaining location based services continuity with inter-RAT mobility may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul. The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
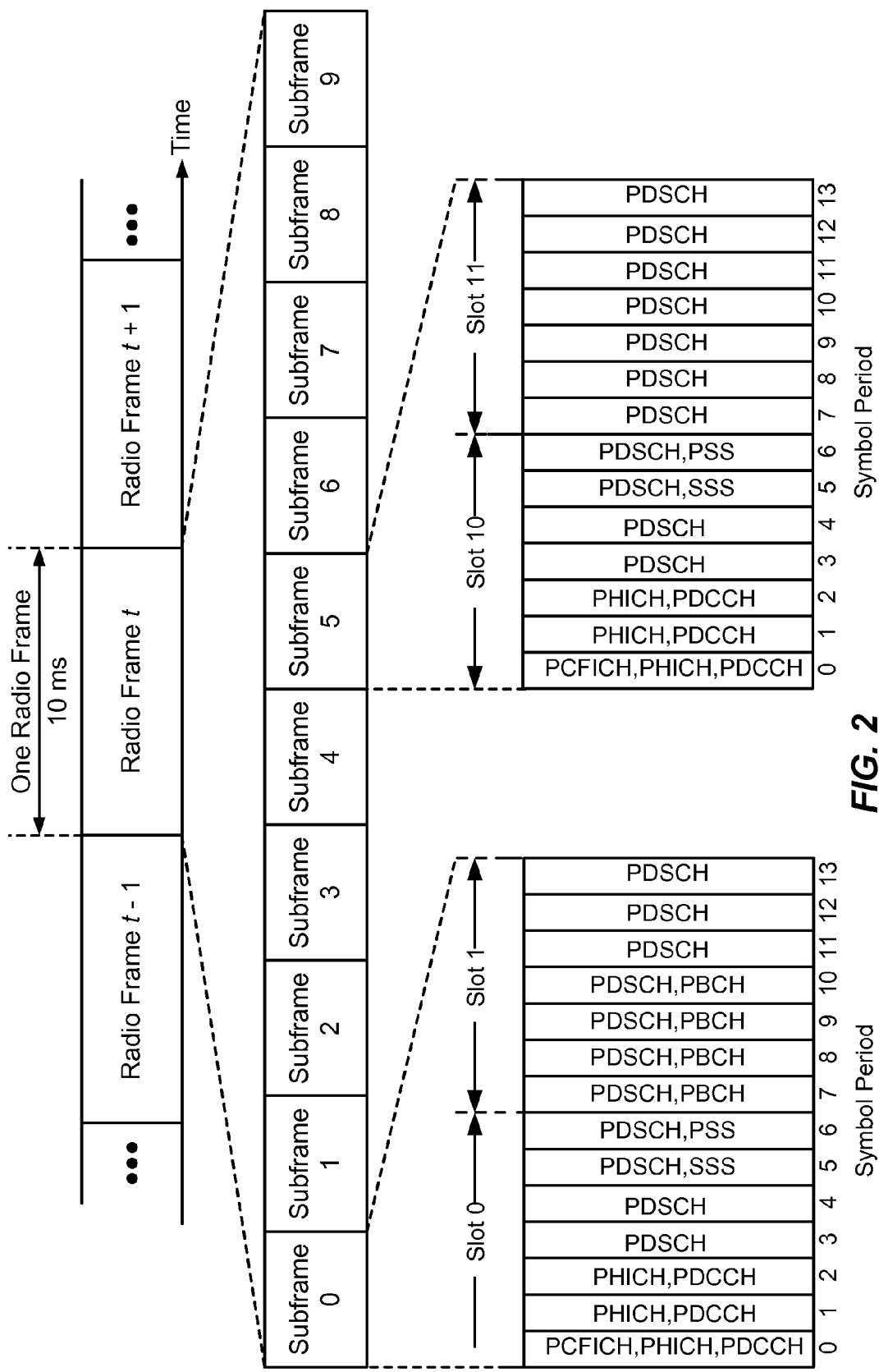
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
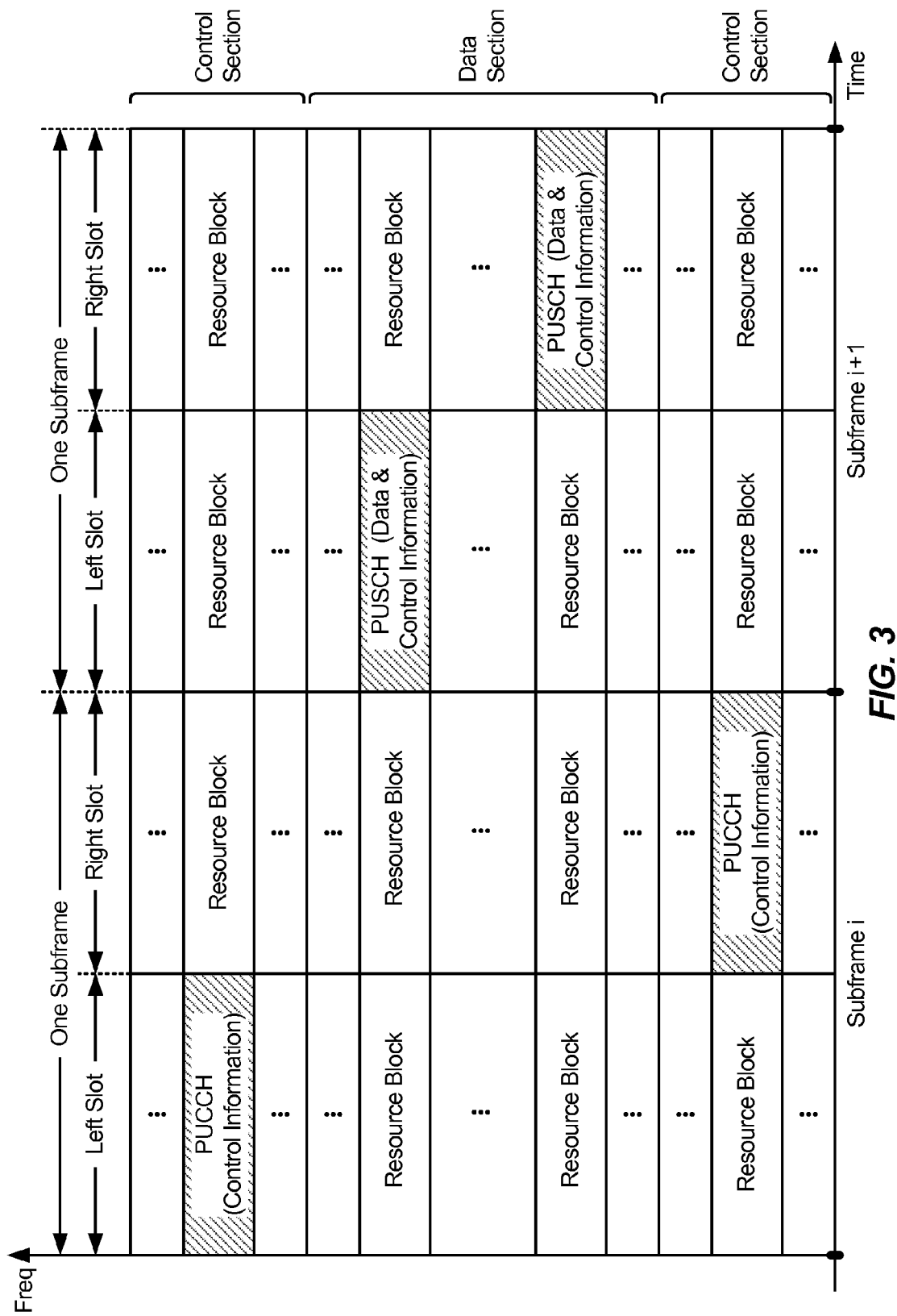
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE are described in 3GPP TS 36.211, entitled "Evolved Universal Terrestrial Radio Access (E-UTRA); Physical Channels and Modulation," which is publicly available.

Figure 4:
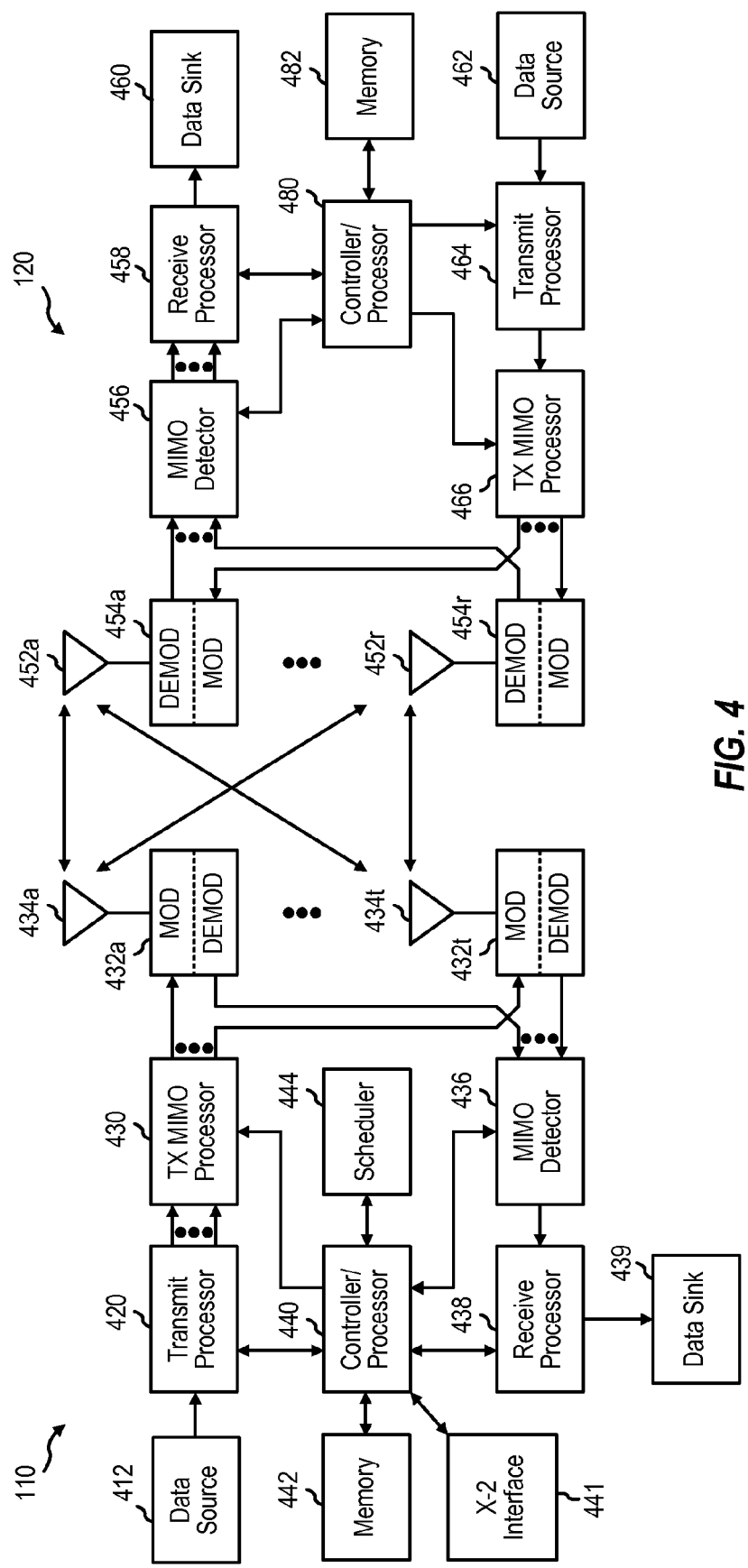
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 5-6, and/or other processes for the techniques described herein. The memories 442 and 482 may store data and program codes for the base station 110 and the UE 120, respectively. A scheduler 444 may schedule UEs for data transmission on the downlink and/or uplink.

In wireless communications, location based services (LBS) may be used by a UE to perform a variety of operations related to the physical location of a UE, such as determining potential candidate base stations during handover, identifying nearby points of interest, etc. In a network using LTE/-A radio access technology (RAT), a positioning protocol called the LTE Positioning Protocol (LPP) may be used. The LTE Positioning Protocol enables communications between a UE and the location server with specialized location-relevant messages such as requesting/providing location based capabilities, requesting/providing assistance data, and requesting/providing location information. Messages such as abort and error are also enabled. The LTE Positioning Protocol may operate on the user plane or the control plane. On the user plane, the LTE Positioning Protocol may be carried by the Secured User Plane Location (SUPL) protocol, version 2.0.

Communications between the UE and the Secured User Plane Location server may use the SUPL Location Platform (SLP). SUPL Location Platform communications are transported over a secured transmission control protocol/internet protocol (TCP/IP) connection. Secured internet protocol (IP) connections may be established using Transport Layer Security (TLS) 1.1 protocol (described in Internet Engineering Task Force Request for Comments 4346). The Transport Layer Security protocol enables encrypting of location data to maintain the privacy of location information.

Figure 5:
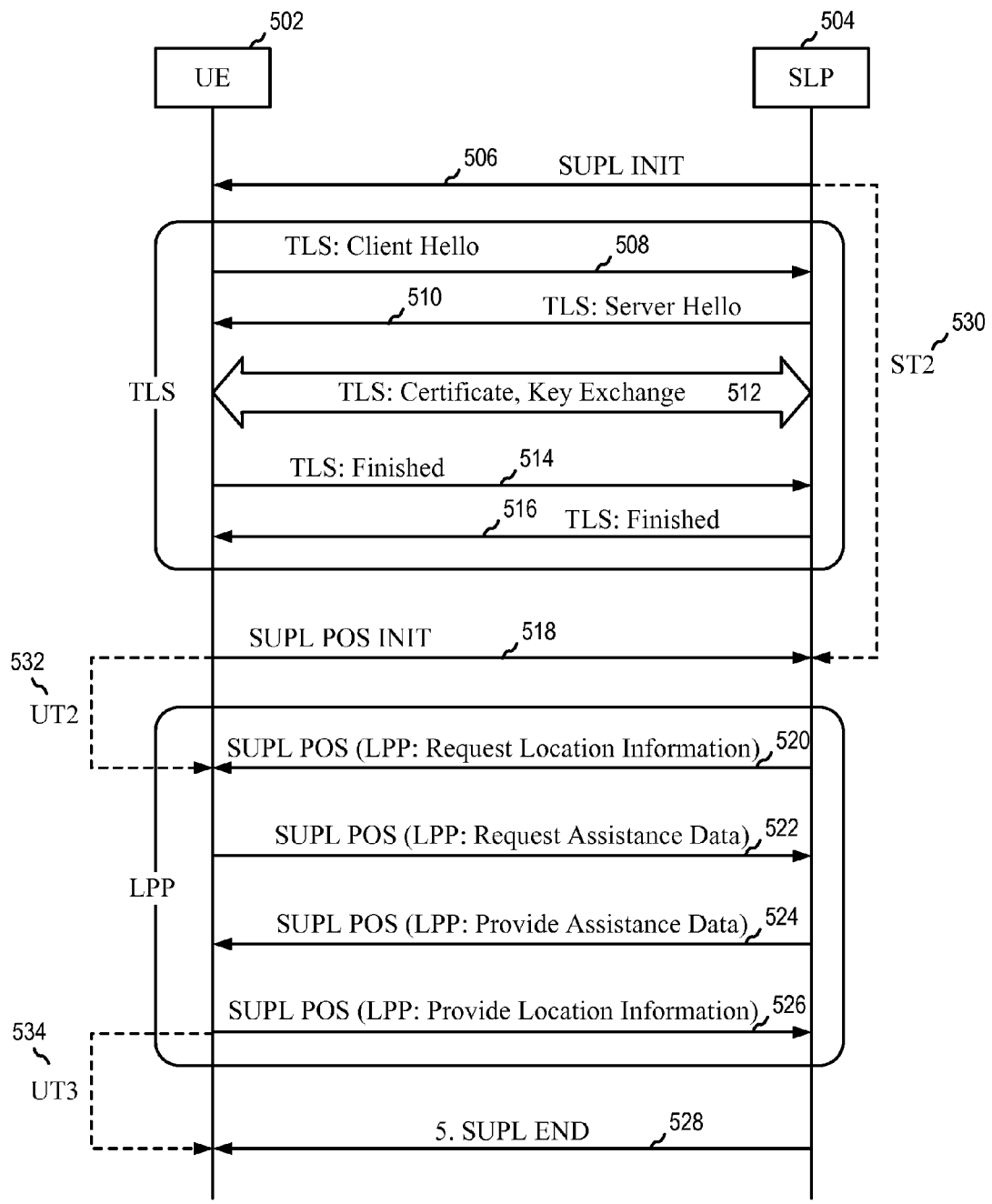
FIG. 5 is a block diagram illustrating a location based services call flow.

A network-initiated location based services call flow between the UE and SUPL is shown in FIG. 5. As illustrated, a UE 502 receives a SUPL initialization message 506 from the SUPL Location Platform server 504. The UE 502 then exchanges Transport Layer Security (TLS) protocol messages with the SUPL Location Platform (SLP) server 504. Those TLS messages include a TLS client hello message 508 from the UE 502, a TLS server hello message 510 from the SLP server 504, a TLS certificate and key exchange 512 between the UE 502 and the SLP server 504, and TLS finished messages 514 and 516 back and forth between the UE 502 and SLP server 504. The UE 502 then sends the SUPL position initialization message 518 to the SLP server 504. The UE 502 then exchanges LTE Positioning Protocol (LPP) messages with the SLP server 504. Those LPP messages include a request location information message 520 from the SLP server 504 to the UE 502, a request assistance data message 522 from the UE 502 to the SLP server 504, a provide assistance data message 524 from the SLP server 504 to the UE 502, and a provide location information message 526 from the UE 502 to the SLP server 504. These LLP messages may assist the UE with identifying its location with information such as satellite acquisition data or measurement data, etc. Finally the SLP server 504 sends the UE 502 a SUPL end message 528.

During an illustrated LBS call flow, certain protocol timers defined in the LTE Positioning Protocol may be used. For example, certain timers are in the order of one second, other timers are in the order of 10 seconds. For example, timer ST2 530 indicates a server timer that tracks the time between sending the SUPL initialization message 506 and receiving the SUPL position initialization message 518. Timer UT2 532 indicates a UE timer that tracks the time between sending the SUPL position initialization message 518 and receiving the LPP request location information message 520. Timer UT3 534 indicates a UE timer that tracks the time between sending the LPP provide location information message 526 and receiving the SUPL end message 528. If the time between any of these events exceeds an expected value, an error may be indicated. In the case of an error during the call flow, the session may not require a restart from the beginning. For example, if there is a timeout during the exchange of LPP messages, the SUPL protocol can continue from the exchange of TLS messages or possibly can continue from earlier LPP messages.

The SUPL protocol can not only be used for the LTE Positioning Protocol but also for the radio resource location services protocol (RRLP), for radio resource control (RRC) in Global System for Mobile Communications (GSM) or Wideband Code Division Multiple Access (WCDMA) networks, and for IS-801 in Code Division Multiple Access (CDMA) networks. RRLP can also be used in LTE networks. Table 1 below illustrates how different location based services protocols are used in different layers for wireless communication depending on the network:

TABLE 1

| | Network | | | |
|---|---|---|---|---|
| | LTE | CDMA 1x or EVDO | WCDMA | GSM |
| Upper Layer | LPP or RRLP | IS-801 | RRLP or RRC | RRLP |
| Middle Layer | SUPL | SUPL | SUPL | SUPL |
| Lower Layer | TCP/IP | TCP/IP | TCP/IP | TCP/IP |

For example, as shown in Table 1 for an LTE network, the LTE Positioning Protocol (LPP) sits above the Secured User Plane Location (SUPL) protocol, which sits above the transmission control protocol/internet protocol (TCP/IP).

Figure 6:
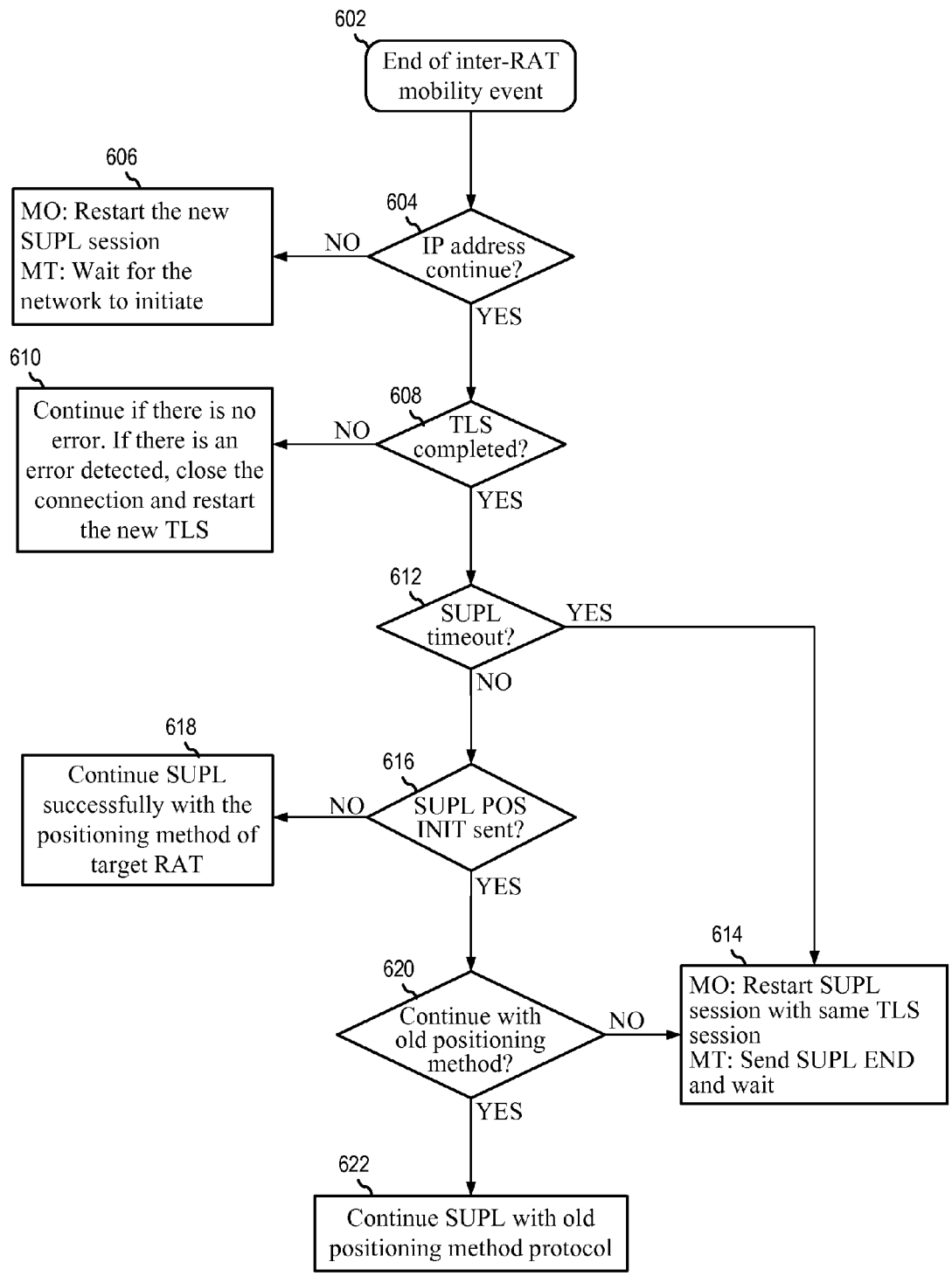
FIG. 6 is a block diagram illustrating a method for maintaining location based services continuity according to one aspect of the present disclosure.

In certain situations, a UE may change from one radio access technology (RAT) network to another. Examples of when a UE may engage in inter-RAT system change include handover (including active mode handover and packet-switched handover), redirection (such as that trigged by 1× circuit switched fallback), cell reselection, or out of service scenarios. If a UE engages in inter-RAT system change and is not able to maintain its IP address, a new location based services session is started. In certain inter-RAT mobility scenarios, however, it is possible for a UE to maintain an internet protocol (IP) address after the inter-RAT system change. Those IP maintaining system changes include:

mobility from a LTE network to an evolved High Rate Packet Data (eHRPD) network
  mobility from an eHRPD network to a LTE network
  mobility from a LTE network to a WCDMA/GSM network
  mobility from a WCDMA/GSM network to a LTE network
  mobility from a GSM network to a WCDMA network
  mobility from a WCDMA network to a GSM network Offered is a method to address this uncertainty and improve location based services continuity during inter-RAT mobility, in one aspect using an IP address maintained by the UE. Specifically, offered are procedures to handle SUPL based location based services protocols during an inter-RAT mobility event. The proposed procedures aim to continue an existing protocol state as much as possible and therefore reduce disruptions to ongoing location based services. FIG. 6 shows one UE method for maintaining location based services continuity according to one aspect of the present disclosure.

At the end of an inter-RAT mobility event, block 602, a UE determines whether the IP address has been maintained, block 604. This may be determined by the non-access-stratum protocol. As shown in block 606, if the IP address has not been maintained and the call is mobile originated (MO), the UE restarts the SUPL session from the beginning. If the IP address has not been maintained and the call is mobile terminated (MT), the UE waits for the network to initiate a new location based services session.

If the IP address is maintained, the UE checks if the Transport Layer Security (TLS) session was completed, as shown in block 608. As shown in block 610, if the TLS session was not completed, and there was no error, the UE continues the TLS session. If the TLS session was not completed, and there was an error, the UE closes the connection and restarts a new TLS session. If the TLS session was completed, the UE checks if there was a SUPL timeout as shown in block 612. As shown in block 614, if there was a SUPL timeout and the call was mobile initiated, the UE restarts the SUPL session while maintaining the same TLS session (for example, continuing from the SUPL position initialization message 518 in FIG. 5). If there was a SUPL timeout and the call was mobile terminated, the UE sends a SUPL end message and waits for the network to initiate the next communication. If there was no SUPL timeout, the UE checks if a SUPL position initialization message was sent, as shown in block 616. If no SUPL position initialization message was sent, the UE continues the Secured User Plane Location (SUPL) protocol (e.g., with a SUPL position initialization) using the positioning method of the target network, as shown in block 618.

As shown in block 620, if the SUPL position initialization message was sent, the UE checks if the positioning method the UE was using with the previous network is operable with the target network. If the previous network's positioning method is operable with the target network, the UE continues using the previous network's positioning method with the target network, as shown in block 622.

As shown in block 614, if the previous network's positioning method is not operable with the target network, and the call was mobile originated, the UE restarts the SUPL session while maintaining the same TLS session. If the previous network's positioning method is not operable with the target network, and the call was mobile terminated, the UE sends a SUPL end message and waits for the network to initiate the next communication.

Table 2 below shows what positioning method protocols for a particular target RAT, based on the source RAT and the location based services protocol being used by the UE in the source RAT. Target radio access technologies are shown in the column headers, source radio access technologies with their protocols are shown in the row headers. For example, if a UE using LPP as the location based services protocol is being transferred from LTE to WCDMA, the UE should use either RRLP or RRC as its new location based services protocol. In another example, if a UE using RRLP as the location based services protocol is being transferred from LTE to WCDMA, the UE should continue to use RRLP as the new protocol as well. Transfer scenarios where a UE may continue to use the same location based services protocol are indicated by a "Same" notation. A comparison like that shown in Table 2 may be checked by the UE in block 620 of FIG. 6, described above.

TABLE 2

| Source (RAT-Protocol) | Target RAT | | | |
|---|---|---|---|---|
| | LTE | eHRPD | WCDMA | GSM |
| LTE - RRLP | — | Same: RRLP | Same: RRLP | Same: RRLP |
| LTE - LPP | — | IS-801 | RRLP or RRC | RRLP |
| eHRPD - IS-801 | LPP | — | — | — |
| WCDMA - RRLP | Same: RRLP or LPP | — | — | — |
| WCDMA - RRC | LPP | — | — | RRLP |
| GSM - RRLP | Same: RRLP or LPP | — | — | Same: RRLP |

Figure 7:
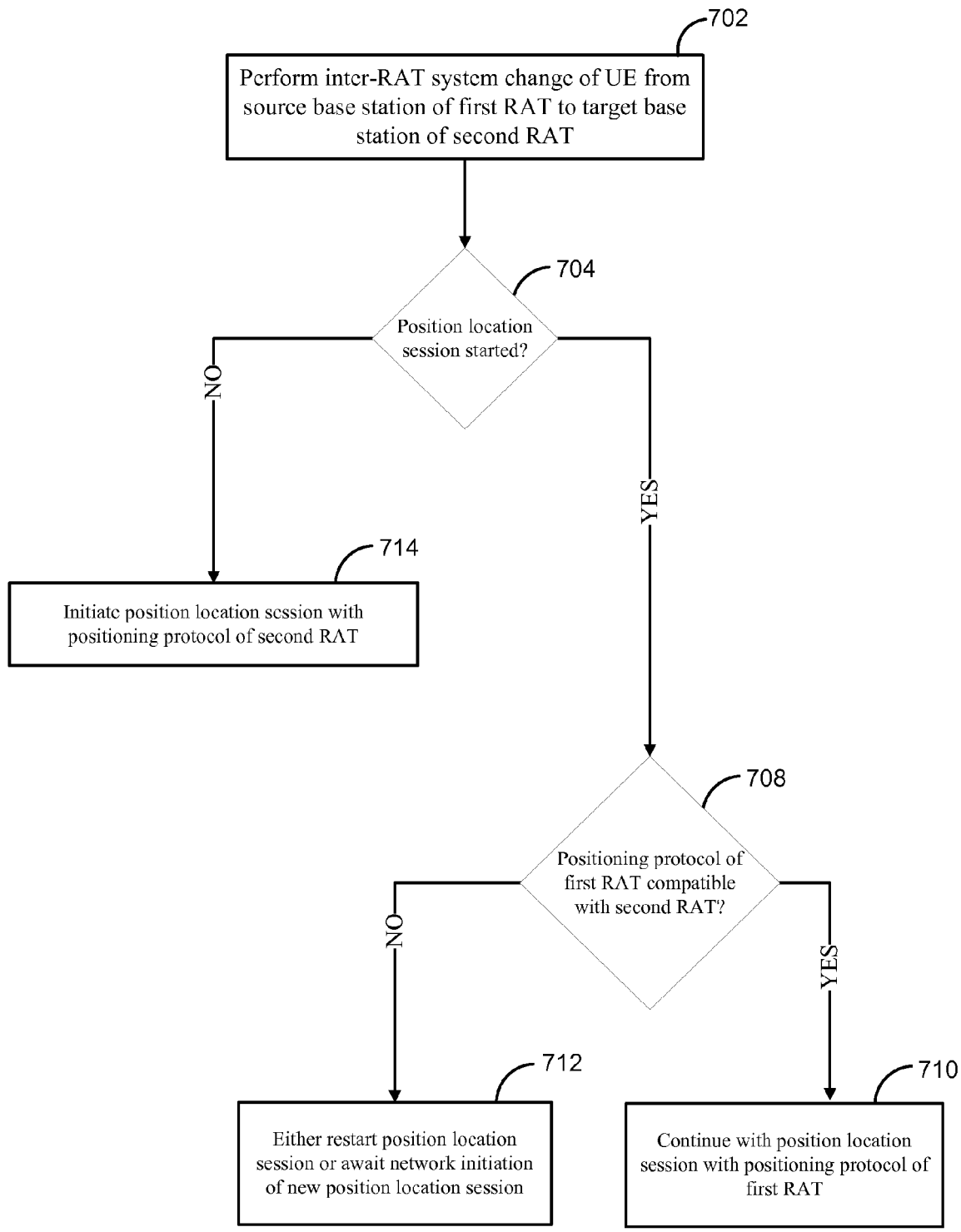
FIG. 7 is a block diagram illustrating a method for maintaining location based services continuity according to one aspect of the present disclosure.

FIG. 7 illustrates a method 700 for maintaining location based services during inter-RAT transfer. In block 702, a UE performs inter-RAT system change of a user equipment from a source base station of a first radio access technology (RAT) to a target base station of a second RAT. In block 704 the UE determines whether a position location session has started. If Yes, in block 708 the UE determines if the positioning protocol of the first RAT is compatible with the second RAT. If the positioning protocol of the first RAT is compatible with the second RAT the UE continues the position location session with the positioning protocol of the first RAT as shown in block 710. If the positioning protocol of the first RAT is not compatible with the second RAT the UE either restarts the position location session or awaits network initiation of a new position location session as shown in block 712. As shown in block 714, the UE initiates a position location session with a positioning protocol of the second RAT when the position location session has not started.

In one configuration, the UE 120 is configured for wireless communication including means for performing inter-RAT system change of a user equipment from a source base station of a first radio access technology (RAT) to a target base station of a second RAT. In one aspect, the means may be the antennae 452, controller/processor 480, receive processor 458, transmit processor 464, and/or memory 482. The UE also includes means for determining whether a position location session has started. The UE further includes means for determining if a positioning protocol used with the first RAT is compatible with the second RAT when the position location session has started. The UE still further includes means for continuing the position location session with the positioning protocol of the first RAT when the positioning protocol is compatible with the second RAT. The UE also includes means for either restarting the position location session or awaiting network initiation of a new position location session when the positioning protocol is not compatible with the second RAT. The UE further includes means for initiating a position location session with a positioning protocol of the second RAT when the position location session has not started. In one aspect, these means may be the controller/processor 480, receive processor 458, transmit processor 464, and/or memory 482. In another aspect, the aforementioned means may include a module or any apparatus configured to perform the functions recited by the aforementioned means.

Figure 8:
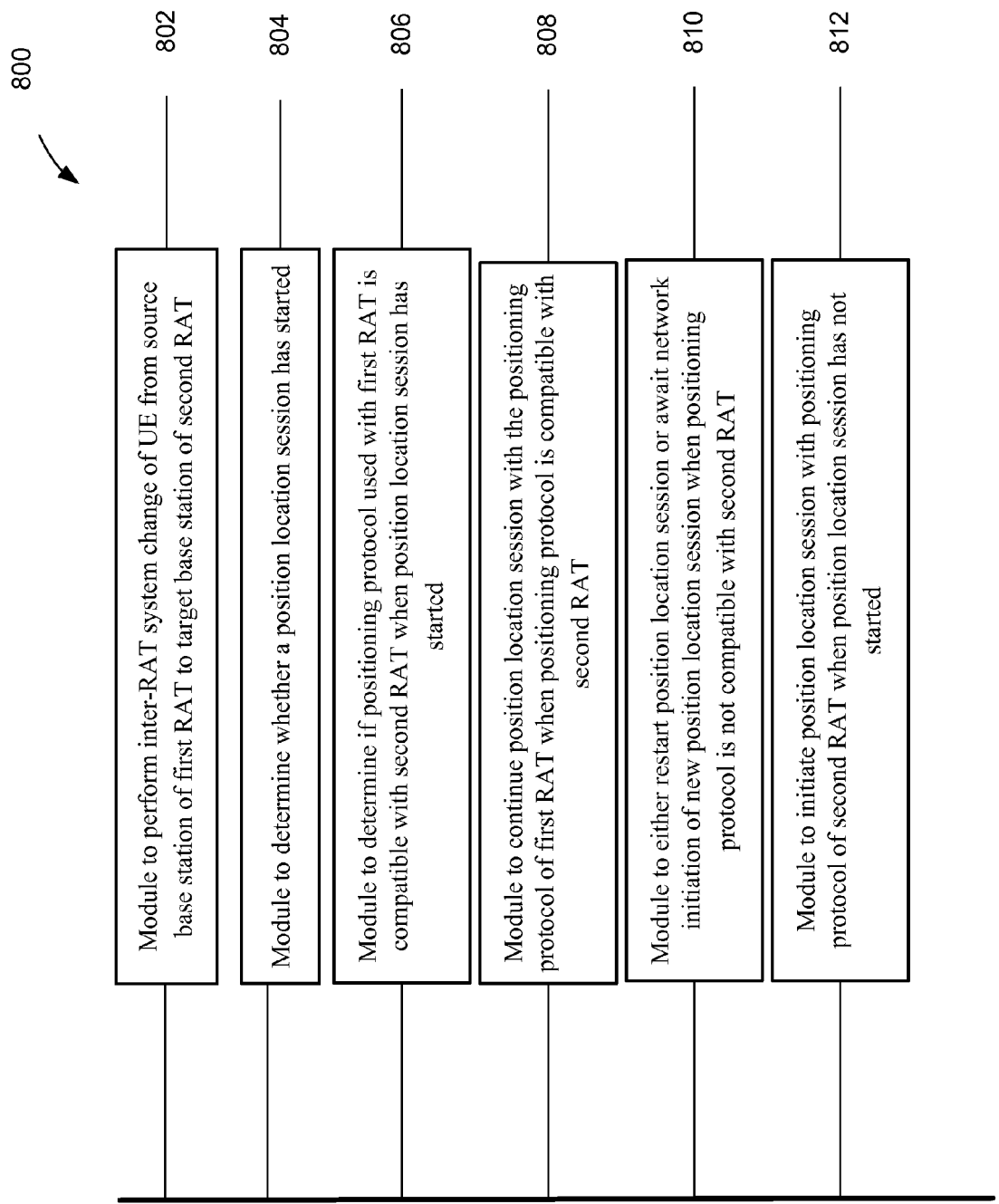
FIG. 8 is a block diagram illustrating components for maintaining location based services continuity according to one aspect of the present disclosure.

FIG. 8 shows a design of an apparatus 800 for a UE, such as the UE 120 of FIG. 4. The apparatus 800 includes a module 802 to perform inter-RAT system change of a user equipment from a source base station of a first radio access technology (RAT) to a target base station of a second RAT. The apparatus 800 also includes a module 804 to determine whether a position location session has started. The apparatus 800 also includes a module 806 to determine if a positioning protocol used with the first RAT is compatible with the second RAT when the position location session has started. The apparatus 800 also includes module 808 to continue the position location session with the positioning protocol of the first RAT when the positioning protocol is compatible with the second RAT. The apparatus 800 also includes module 810 to either restart the position location session or await network initiation of a new position location session when the positioning protocol is not compatible with the second RAT. The apparatus 800 also includes module 812 to initiate a position location session with a positioning protocol of the second RAT when the position location session has not started. The modules in FIG. 8 may include processors, electronics devices, hardware devices, electronics components, logical circuits, memories, software codes, firmware codes, etc., or any combination thereof.

The techniques discussed above allow a UE to continue using existing location based services sessions where possible. Such techniques can reduce service disruption and improve service continuity.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media may include both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing location based services during wireless communication, the method comprising: performing inter-radio access technology (RAT) system change of a user equipment from a source base station of a first radio access technology (RAT) to a target base station of a second RAT;
   determining whether a position location session has started; when the position location session has started, determining if a positioning protocol used with the first RAT is compatible with the second RAT; when the positioning protocol is compatible with the second RAT, continuing the position location session with the positioning protocol of the first RAT; when the positioning protocol is not compatible with the second RAT, either restarting the position location session or awaiting network initiation of a new position location session; and when the position location session has not started, initiating a position location session with a positioning protocol of the second RAT;
   determining when an internet protocol address of the user equipment is maintained during the inter-RAT system change; determining whether the position location session has started when the internet protocol address is maintained; and starting a new position location session when the internet protocol address is not maintained.

2. The method of claim 1 further comprising:
   determining whether a Transport Layer Security (TLS) protocol exchange has completed;
   determining whether a Secured User Plane Location protocol timeout has occurred when the TLS protocol exchange has completed;
   continuing the TLS protocol exchange when the TLS protocol exchange has not completed and no TLS protocol error is indicated; and
   restarting the TLS protocol exchange when a TLS protocol error is indicated.

3. The method of claim 1 in which the determining whether a position location session has started comprises determining whether a Secured User Plane Location position initialization message has been sent.

4. The method of claim 1 in which the position location session uses a Long Term Evolution (LTE) Positioning Protocol (LPP).

5. An apparatus for wireless communication, the apparatus comprising:
   means for performing inter-radio access technology (RAT) system change of a user equipment from a source base station of a first radio access technology (RAT) to a target base station of a second RAT;

means for determining whether a position location session has started;

means for determining if a positioning protocol used with the first RAT is compatible with the second RAT when the position location session has started;

means for continuing the position location session with the positioning protocol of the first RAT when the positioning protocol is compatible with the second RAT;

means for either restarting the position location session or awaiting network initiation of a new position location session when the positioning protocol is not compatible with the second RAT;

means for initiating a position location session with a positioning protocol of the second RAT when the position location session has not started;

means for determining whether an internet protocol address of the user equipment is maintained during the inter-RAT system change;

means for determining whether the position location session has started when the internet protocol address is maintained; and means for starting a new position location session when the internet protocol address is not maintained.

6. The apparatus of claim 5 further comprising:

means for determining whether a Transport Layer Security (TLS) protocol exchange has completed;

means for determining whether a Secured User Plane Location protocol timeout has occurred when the TLS protocol exchange has completed;

means for continuing the TLS protocol exchange when the TLS protocol exchange has not completed and no TLS protocol error is indicated; and means for restarting the TLS protocol exchange when a TLS protocol error is indicated.

7. The apparatus of claim 5 in which the means for determining whether a position location session has started comprises means for determining whether a Secured User Plane Location position initialization message has been sent.

8. The apparatus of claim 5 in which the position location session uses a Long Term Evolution (LTE) Positioning Protocol (LPP).

9. A computer program product, comprising:

a non-transitory computer-readable medium having program code recorded thereon, the program code comprising:

program code to perform inter-radio access technology (RAT) system change of a user equipment from a source base station of a first radio access technology (RAT) to a target base station of a second RAT;

program code to determine whether a position location session has started;

program code to determine if a positioning protocol used with the first RAT is compatible with the second RAT when the position location session has started;

program code to continue the position location session with the positioning protocol of the first RAT when the positioning protocol is compatible with the second RAT;

program code to either restart the position location session or await network initiation of a new position location session when the positioning protocol is not compatible with the second RAT;

program code to initiate a position location session with a positioning protocol of the second RAT when the position location session has not started;

program code to determine whether an internet protocol address of the user equipment is maintained during the inter-RAT system change;

program code to determine whether the position location session has started when the internet protocol address is maintained; and program code to start a new position location session when the internet protocol address is not maintained.

10. The computer program product of claim 9 further comprising:

program code to determine whether a Transport Layer Security (TLS) protocol exchange has completed;

program code to determine whether a Secured User Plane Location protocol timeout has occurred when the TLS protocol exchange has completed;

program code to continue the TLS protocol exchange when the TLS protocol exchange has not completed and no TLS protocol error is indicated; and program code to restart the TLS protocol exchange when a TLS protocol error is indicated.

11. The computer program product of claim 9 in which the program code to determine whether a position location session has started comprises program code to determine whether a Secured User Plane Location position initialization message has been sent.

12. The computer program product of claim 9 in which the position location session uses a Long Term Evolution (LTE) Positioning Protocol (LPP).

13. An apparatus configured for wireless communication, comprising:

at least one processor; and a memory coupled to said at least one processor, wherein said at least one processor is configured:

to perform inter-radio access technology (RAT) system change of a user equipment from a source base station of a first radio access technology (RAT) to a target base station of a second RAT;

to determine whether a position location session has started;

to determine if a positioning protocol used with the first RAT is compatible with the second RAT when the position location session has started;

to continue the position location session with the positioning protocol of the first RAT when the positioning protocol is compatible with the second RAT;

to either restart the position location session or await network initiation of a new position location session when the positioning protocol is not compatible with the second RAT;

to initiate a position location session with a positioning protocol of the second RAT when the position location session has not started;

to determine whether an internet protocol address of the user equipment is maintained during the inter-RAT system change;

to determine whether the position location session has started when the internet protocol address is maintained; and to start a new position location session when the internet protocol address is not maintained.

14. The apparatus of claim 13 in which the at least one processor is further configured:

to determine whether a Transport Layer Security (TLS) protocol exchange has completed;

to determine whether a Secured User Plane Location protocol timeout has occurred when the TLS protocol exchange has completed;

to continue the TLS protocol exchange when the TLS protocol exchange has not completed and no TLS protocol error is indicated; and to restart the TLS protocol exchange when a TLS protocol error is indicated.

15. The apparatus of claim 13 in which the at least one processor is further configured to determine whether a Secured User Plane Location position initialization message has been sent.

16. The apparatus of claim 13 in which the position location session uses a Long Term Evolution (LTE) Positioning Protocol (LPP).

* * * * *